United States Patent
Schwerdhofer et al.

[15] 3,661,034
[45] May 9, 1972

[54] MULTIPLE-SPEED HUB

[72] Inventors: Hans Joachim Schwerdhofer; Horst Schulz, both of Schweinfurt am Main, Germany

[73] Assignee: Fichtel & Sachs AG, Schweinfurt am Main, Germany

[22] Filed: Jan. 13, 1970

[21] Appl. No.: 2,513

[30] Foreign Application Priority Data

Jan. 16, 1969 Germany.................P 19 02 021.4

[52] U.S. Cl.....................................................74/752 E
[51] Int. Cl......................................................F16h 5/46
[58] Field of Search...............................74/750 B, 752 E, 752

[56] References Cited

UNITED STATES PATENTS

| | | | |
|---|---|---|---|
| 3,182,529 | 5/1965 | Schwerdhofer | 74/750 B |
| 3,492,893 | 2/1970 | Shimano et al. | 74/752 E |
| 3,513,726 | 5/1970 | Shimano et al. | 74/752 E |
| 3,520,214 | 7/1970 | Schwerdhofer | 74/752 E |

FOREIGN PATENTS OR APPLICATIONS 632,305  11/1949  Great Britain.........................74/752 E Primary Examiner—C. J. Husar
Assistant Examiner—Thomas C. Perry
Attorney—Kelman and Berman

[57] ABSTRACT

A three-speed bicycle hub has planetary gearing axially centered on the hub shaft. A driving sleeve coupled to the driver and drive sprocket is arranged on the shaft on one side of the sun gear and a driven shaft coupled to the hub shell on the other side. The planet carrier projects axially in both directions beyond the planet gears and the sun gear, and the ring gear similarly projects beyond the planet carrier. A pair of overrunning clutches on each side of the sun gear connects the two sleeves to the ring gear and to the planet carrier. One clutch of each pair can be disengaged by a centrifugal governor whose flyweight is mounted on a respective sleeve in a hub cavity portion remote from the gearing.

21 Claims, 6 Drawing Figures

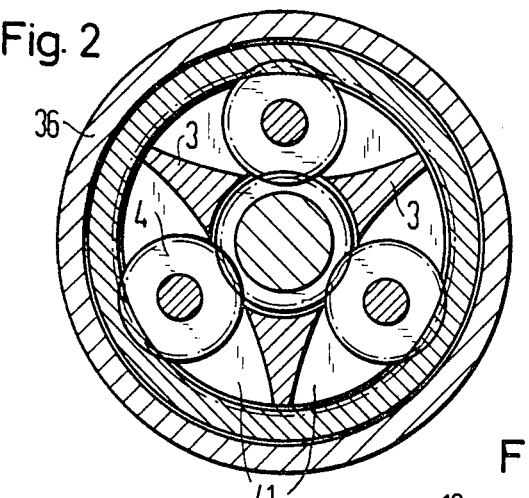
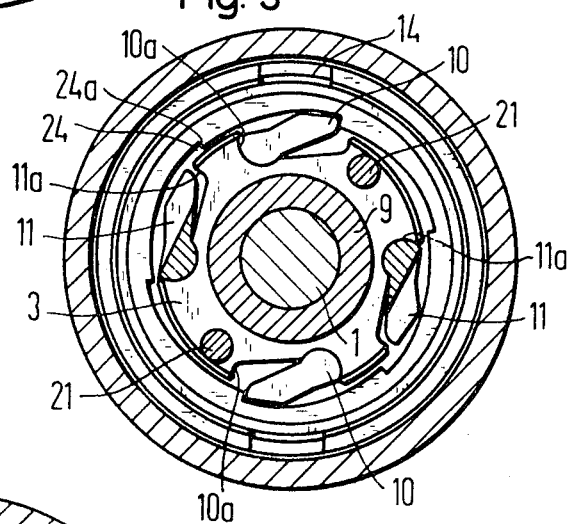
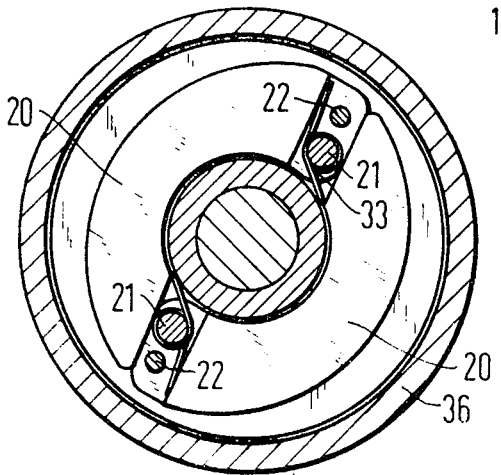

MULTIPLE-SPEED HUB

This invention relates to multiple-speed hubs for bicycles and like vehicles, and particularly to hubs capable of at least three different transmission ratios and shifted with the assistance of centrifugal governors arranged in the hub shell.

More specifically, this invention is concerned with an improved, automatically shifting, multiple-speed hub disclosed and claimed in the copending, commonly owned application, Ser. No. 830,779, now U.S. Pat. No. 3,546,971 filed on June 5, 1969. It has been shown in the earlier application that a hub of the general type referred to above may provide a number of transmission ratios which is greater by two than the number of planetary gearing sets in the hub if the hub is equipped with centrifugal governors in a number smaller by one than the number of transmission ratios, the governors controlling clutches in the hub.

The object of the present invention is the provision of a multiple-speed hub of the general arrangement disclosed in the earlier application which is simple in its construction and low in bulk and weight.

With these and other objects in view, the invention, in one of its more specific aspects, resides in a hub for a bicycle or other vehicle which has a driver rotatably mounted on the hub shaft. A hub shell is mounted on the shaft and on the driver for rotation about the shaft axis. The hub encloses conventional planetary gearing including a sun gear on the shaft, a ring gear and planet carrier arranged for rotation about the shaft axis, a planet gear on the carrier in simultaneous meshing engagement with the sun gear and the ring gear.

A driving sleeve and a driven sleeve are rotatably mounted on the shaft and offset from the sun gear in opposite axial directions. A first coupling arrangement couples the driving sleeve to the driver for simultaneous movement about the hub axis. A second coupling arrangement similarly couples the driven sleeve to the hub shell. Four clutches are operatively interposed between the driving sleeve and the planet carrier, the driving sleeve and the ring gear, the driven sleeve and the planet carrier, and the driven sleeve and the ring gear respectively. The first and second-mentioned clutches form a first pair and the two last-mentioned clutches form a second pair of clutches. First and second centrifugal governors are respectively connected to single clutches of the two pairs for operating the same. Drive means are provided for rotating the two governors in response to rotation of the driver.

Additional features, other objects and many of the attendant advantages of this invention will readily become apparent from the following detailed description of preferred embodiments when considered in connection with the appended drawing in which:

FIGS. 2, 3, 4 and 5 illustrate the hub of FIG. 1 in respective sections on the lines II—II, III—III, IV—IV and V—V.

Figure 1:
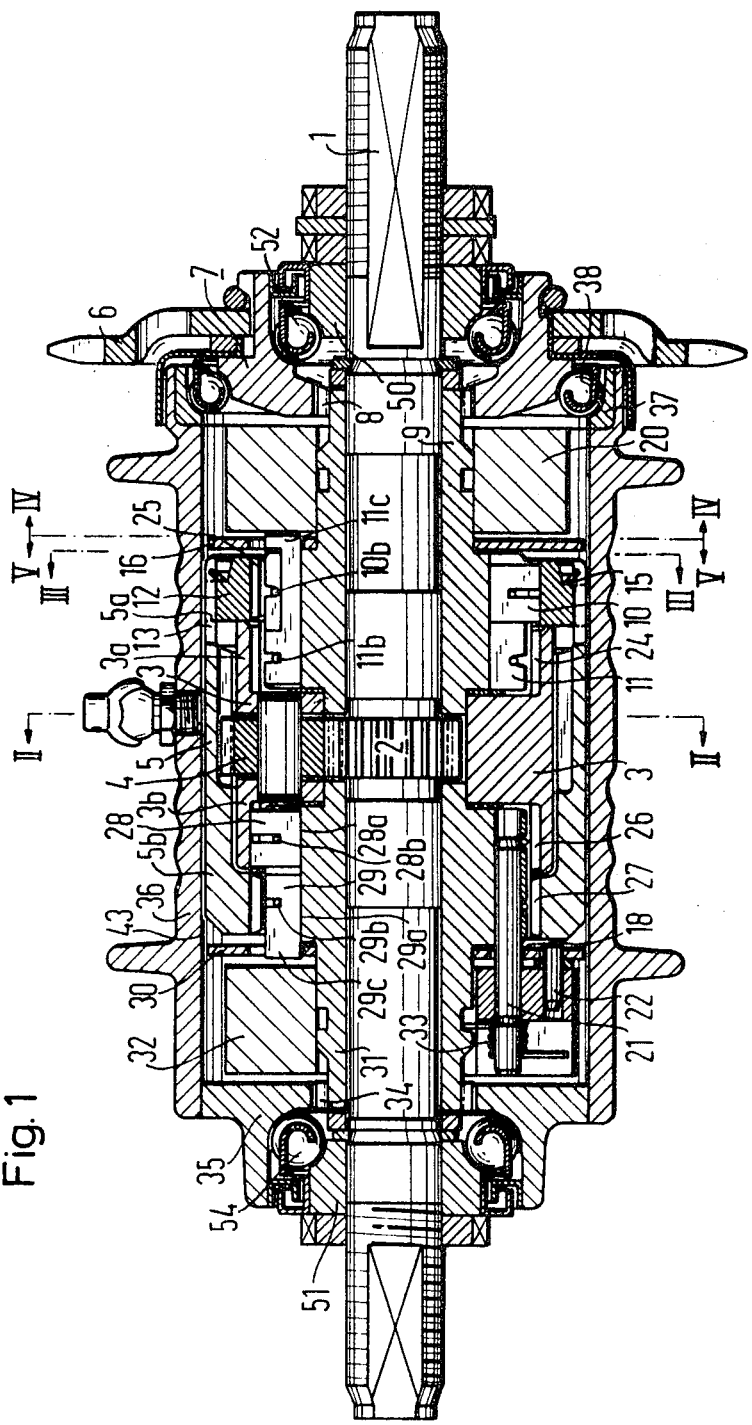
FIG. 1 shows a three-speed hub of the invention in section on its axis.
Figure 5:
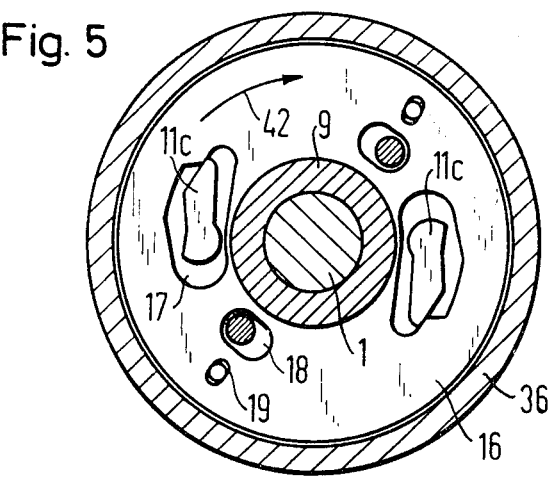

Referring now to FIGS. 1 to 5 in detail, there is seen a shaft 1 which is fixedly fastened to the frame of a bicycle or like vehicle under normal operating conditions. Inner bearing rings 50,51 are adjustably fastened on the two axial end portions of the shaft 1. A circular row of bearing balls 52 is interposed between the ring 50 and an outer bearing race on a tubular driver 7 to which a drive sprocket 6 is attached.

A hub shell 36 having a smooth cylindrical bore 43 is rotatably supported on the driver 7 by means of a ball bearing 38, and on the bearing ring 51 by means of a ball bearing 54, the outer race for the bearing 38 being provided by a ring 37 fixedly fastened to the inner wall of the shell 36, and the outer race for the bearing 54 by an annular disc 35 which axially bounds the cavity between the shaft 1 and the shell 36 in a direction away from the drive sprocket 6. The disc 35 and the ring 37 are made of hardened steel and are secured to the inner, smooth wall of the shell 36 by a press fit, the shell being made of mild steel.

The hub shell cavity contains planetary gearing including a sun gear 2 fixed on the shaft 1, a planet carrier 3, planet gears 4 arranged in recesses 41 of the planet carrier 3 (FIG. 2), and a ring gear 5, the planet gears 4 being rotatably mounted on the carrier 3 and simultaneously meshing with the sun gear 2 and the ring gear 5.

The planet carrier 3 and the ring gear 5 may be coupled alternatively with the driver 7 by means of a driving sleeve 9 rotatably mounted on the shaft 1 between the driver 7 and the sun gear 2, and normally fixed to the driver 7 by interengaged ribs and recesses 8. Two pockets 11a (FIG. 3) in the sleeve 9 pivotally accommodate pawls 11, and the pawls are normally held in driving engagement with a ratchet rim 24 on a tubular extension 3a of the planet carrier 3 by an annular pawl spring 11b.

Another pair of pockets 10a angularly offset from the pockets 11a; in the sleeve 9 (FIG. 3) pivotally accommodates pawls 10 biased by a spring 10b toward engagement with a rim of ratchet teeth 25 of a ring 12. The ring is fixedly secured on a tubular extension 5a of the ring gear 5 which projects beyond the planet carrier extension 3a toward the driver 7. The second pawl-and-ratchet clutch 10,25 is engaged in all operative conditions of the illustrated hub, while the first-described clutch 11,24 is controlled by a first centrifugal governor 20,16 which will presently be described.

The hub shell 36 is fixedly connected with a driven sleeve 31 by means of interengaged teeth or ribs 34 on the sleeve 31 and on the disc 35. The sleeve 31 which is identical with the sleeve 9, envelops the axial portion of the shaft 1 between the sun gear 2 and the bearing 54 and may be coupled to the planet carrier 3 by means of pawls 28 pivotally retained in pockets 28a of the sleeve 31 and biased toward engagement with a ratchet rim 26 on an inner face of a tubular extension 3b of the planet carrier 3 by an annular pawl spring 28b. The ring gear 5 may be coupled to the sleeve 31 by means of pawls 29 in pockets 29a of the sleeve 31 when engaged with a ratchet rim 27 on a tubular extension 5b of the ring gear 5 under the biasing force of a pawl spring 29b.

The third pawl-and-ratchet clutch 28,26 is permanently engaged while the fourth clutch 29,27 is controlled by a second centrifugal governor 32,30 which will be described hereinbelow.

As far as described so far, the hub is operated as follows:

As shown in FIG. 1, it is set for its lowest transmission ratio or low speed. Torque received by the sprocket 6 from the non-illustrated pedals by a link chain, not shown, is transmitted to the hub shell 36 and to the wheel rim attached to the shell, but not shown, by the driver 7, driving sleeve 9, second clutch 10,25, ring 12, ring gear 5, planet gears 4, planet carrier 3, third clutch 28,26, driven sleeve 31 and disc 35. Because the planet carrier 3 rotates more slowly than the ring gear 5, the hub shell 36 rotates more slowly than the driver 7. The pawls 11 skip over the ratchet teeth 24, and the pawls 29 over the ratched teeth 27.

As the rotary speed of the driver 7 is increased by quicker pedaling, the first clutch 11,24 becomes effective, as will be described below, and torque is transmitted from the sprocket 6 to the shell 36 by way of the driving sleeve 9, clutch 11,24 planet carrier 3, third clutch 28,26, driven sleeve 31 and disc 35. The planetary gearing idles. Because both sleeves 9,31 are coupled to the planet carrier 3, the hub shell 36 and the driver 7 rotate at the same speed. The pawls 10 skip over the ratchet teeth 25, and the pawls 29 skip over the ratchet teeth 27. The hub is set for its intermediate speed.

At a further increase in pedaling speed, the fourth clutch 29,27 becomes operative, and torque is transmitted between the sprocket 6 and the shell 36 by way of the driver 7, driving sleeve 9, first clutch 11,24, planet carrier 3, planet gears 4, ring gear 5, fourth clutch 29,27, driven sleeve 31 and disc 35. Because the ring gear 5 rotates more quickly than the planet carrier 3, the hub shell rotates at a higher speed than the driver 7. The pawls 10 skip over the ratchet 25, and the pawls 28 skip over the ratchet 26.

The first centrifugal speed governor 20,16, briefly referred to above, includes two flyweights 20 (FIG. 4) which are pivotally mounted on the driving sleeve 9 by means of pivot pins 21, and thus connected to the driver 7. Axial connecting pins 22 fastened to the flyweights near their pivots engage radially elongated slots 19 of a control disc 16 (FIG. 5) which rotates freely on the sleeve 9. The pivot pins 21 pass through circumferentially elongated slots 18 of the disc 16. Recesses 17 in the disc 16 are engaged by axial projections 11c of the pawls 11. The walls of the disc 16 in the recesses 17 cammingly cooperate with the projections 11c. In the position illustrated in FIG. 5, the pawls 11 are retracted from the associated ratchet 24 by the cam faces of the disc 16.

Springs 33 bias the flyweights 20 toward the position shown in FIG. 4 in which the flyweights are near the axis of rotation of the hub. At a rotary speed of the driving sleeve 9 which is determined by suitably selecting the springs 33, the flyweights 20 move radially away from the hub axis. The connecting pins 22 pivot the control disc 16 out of the position seen in FIG. 5 so that the projections 11c of the pawls 11 are released by the walls of the recesses 17, and the pawls can engage the ratchet 24 under the resilient force of the spring 11b.

The second centrifugal governor 32,30 is similarly constructed and operates in an analogous manner. It has a control disc 30 which engages projections 29c of the pawls 29 and holds the pawls disengaged from the ratchet 27 as long as the pivotally mounted flyweights 32 of the second governor are held by their return spring near the hub axis. When the flyweights swing outwardly, the pawls 29 are engaged with the ratchet 27 by the spring 29b. *The flyweights 32 are pivotally fastened to the driven sleeve 31, and thus rotate with the hub shell 36.*

The ring 12 and the ring gear 5 constitute a functional unit which consists of two elements only for convenience in assembling the hub. Interengaged slots 13 in the extension 5a of the ring gear 5 and projections 14 on the ring 12 prevent relative angular movement of the ring 12 of the ring gear 5. A snap ring 15 prevents significant relative axial movement. The snap ring is dished in an axial direction in such a manner that it urges the ring 12 into frictional engagement with the extension 3a of the planet carrier 3 and tends to brake the normally faster turning ring gear 5. The function of this braking arrangement will presently become apparent. Because the ring 12 may be released from the ring gear 5, it is possible to make the pitch diameter of the ratchet 25 approximately equal to that of the ratchet 24 without causing difficulties during assembly.

When it is desired to reduce the transmission ratio of the hub from high speed to intermediate speed, the pedaling rate is reduced until the rotary speed of the hub shell 36 and of the driven sleeve 31 drops below the shifting speed of the flyweights 32, and the pawls 29 are disengaged from the ratchet 27 on the ring gear by the control disc 30 when no torque is transmitted by the fourth clutch 27,29, engagement being maintained by the shape of the engaged pawl and ratchet portions as long as power is transmitted by the clutch 27,29. Disengagement can occur only when the ring gear 5 has been braked by the snap ring 15 to a rotary speed not greater than that of the driven sleeve 31 and of the hub shell 36. While the hub is thus prepared to the lower transmission ratio automatically in response to slower pedaling, the actual shifting point may be selected to some extent by the rider of the bicycle or other vehicle, and high-speed operation of the hub can be maintained at lower rotary speeds than the normal shifting speed of the second governor if so desired.

The hub may shift from normal to slow speed when the flyweights 20 rotate slowly enough to return toward their rest position. They cannot pivot inward and turn the disc 16 in the direction of the arrow 42 (FIG 5) to retract the pawls 11 as long as the driving sleeve 9 and the pawls 11 are not turned backwards relative to the ratchet 24 because of the shapes of the pawls and ratchet teeth which make the first clutch 11,24 self-holding. The first centrifugal governor 16,20 thus makes the hub ready for downshifting into slow gear, but the speed shift does not occur until the operator back-pedals.

The snap ring 15 then causes the planetary gearing to stop, and the driving sleeve 9 with the pawls 11 moves backwardly relative to the ratchet 24. A mere standstill of the driver 7 and of the driving sleeve 9 does not reliably cause disengagement of the clutch 11,24. When the sleeve 9 stops, the planetary gearing also stops, and the pawls 11 are not released by the teeth of the ratchet 24.

The self-holding properties of the afore-described pawl-and-ratchet clutches may be achieved, as shown in FIG. 3, for the first clutch 11,24, by making the flanks 24a of the ratchet teeth 24 which abuttingly engage the tips of the pawls 11 approximately radial relative to the axis of rotation, or by even slightly undercutting them. The flank 24a is so close to a radial position that the desired self-holding effect is achieved.

If the operator delays the brief back-pedaling movement which is required for switching from normal to low speed when the hub is ready for switching, he may continue operating the hub at its intermediate transmission ratio below the shifting point determined by the return spring 33 of the flyweights 20.

The sequence in which the speed governors 20,16 and 32,30 respond to increasing pedaling speed is not essential. The illustrated apparatus may be modified without change in function to make the governor 32,30 respond first to an increase in the driving speed, and to have the governor 20,16 become operative at a higher speed. However, it is convenient to build the two governors 20,16 and 32,30 from identical parts, as far as possible, thereby causing the driver-connected governor 20,16 to respond first when the hub is in slow speed position because the hub-connected governor 32,30 rotates more slowly under these conditions.

Figure 6:
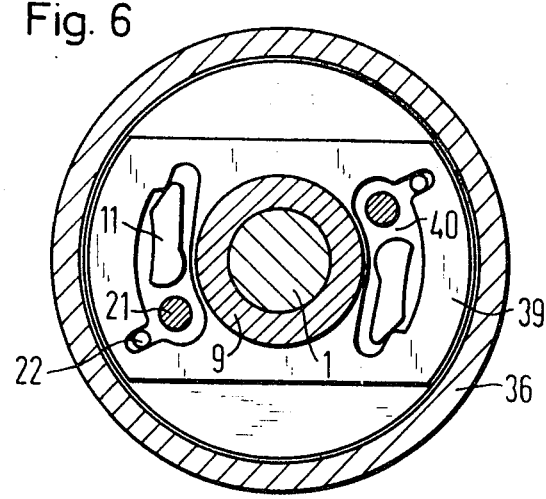
FIG. 6 shows a modified hub in a view corresponding to that of FIG. 5.

The hub partly illustrated in FIG. 6 is identical with the hub described above with reference to FIGS. 1 to 5 except for the control discs 39 of its centrifugal governors of which one is seen in FIG. 6. Instead of the two recesses 17 and pairs of slots 18,19 in the disc 16 and in the disc 30, not explicitly shown, the disc 39 has two openings 40 each of which receives a pawl 11, a pivot pin 21 and a connecting pin 22. The disc 39 operates in the same manner as the afore-described disc 16 or the disc 30.

Obviously, other modifications and variations of the present invention are possible in the light of the above teachings. It is therefore to be understood that, within the scope of the appended claims, the invention may be practiced otherwise than as specifically described.

We claim:
1. A multiple-speed hub for a bicycle and like vehicle comprising, in combination:
 a. a shaft (1) having an axis;
 b. a driver (7) rotatably mounted on said shaft;
 c. a hub shell (36) mounted on said shaft and on said driver for rotation about said axis;
 d. planetary gearing in said shell and including a sun gear (2) on said shaft, a ring gear (5) and a planet carrier (3) arranged for rotation about said axis, and a planet gear (4) rotatably mounted on said carrier in simultaneous meshing engagement with said sun gear ans with said ring gear;
 e. a driving sleeve member (9) and a driven sleeve member (31) rotatably mounted on said shaft and offset from said sun gear in opposite axial directions;
 f. first coupling means (8) coupling said driving sleeve member to said driver for simultaneous movement about said axis;
 g. second coupling means (34) coupling said driven sleeve member to said hub shell for simultaneous movement about said axis;
 h. a first clutch (11,24) operatively interposed between said driving sleeve member and said planet carrier;
 i. a second clutch (10,25) operatively interposed between said driving sleeve member and said ring gear;

j. a third clutch (28,26) operatively interposed between said driven sleeve member and said planet carrier;
k. a fourth clutch (29,27) operatively interposed between said driven sleeve member and said ring gear,
  1. said first and second clutches constituting a first pair of clutches, and
  2. said third and fourth clutches constituting a second pair of clutches;
l. a first centrifugal governor (20,16) connected to one clutch of said first pair for operating the same,
  1. said governor including a flyweight mounted on said driving sleeve member for rotation therewith, and being axially offset from said first and second clutches in a direction away from said sun gear;
m. a second centrifugal governor (32,30) connected to one clutch of said second pair for operating the same; and
n. drive means for rotating said second governor in response to rotation of said driver.

2. A multiple-speed hub for a bicycle and like vehicle comprising, in combination:
a. a shaft (1) having an axis;
b. a driver (7) rotatably mounted on said shaft;
c. a hub shell (36) mounted on said shaft and on said driver for rotation about said axis;
d. planetary gearing in said shell and including a sun gear (2) on said shaft, a ring gear (5) and a planet carrier (3) arranged for rotation about said axis, and a planet gear (4) rotatably mounted on said carrier in simultaneous meshing engagement with said sun gear and with said ring gear;
e. a driving sleeve member (9) and a driven sleeve member (31) rotatably mounted on said shaft and offset from said sun gear in opposite axial directions;
f. first coupling means (8) coupling said driving sleeve member to said driver for simultaneous movement about said axis;
g. second coupling means (34) coupling said driven sleeve member to said hub shell for simultaneous movement about said axis;
h. a first clutch having a pawl portion (11) mounted on said driving sleeve member and a ratchet portion (24) mounted on said planet carrier for engagement with said pawl portion;
i. a second, overruning clutch (10,25) operatively interposed between said driving sleeve member and said ring gear;
j. a third clutch (28,26) operatively interposed between said driven sleeve member and said planet carrier;
k. a fourth clutch (29,27) operatively interposed between said driven sleeve member and said ring gear,
  1. said first and second clutches constituting a first pair of clutches, and
  2. said third and fourth clutches constituting a second pair of clutches;
l. a first centrifugal governor (20,16) operatively connected to said first clutch for operating the same,
  1. said second clutch being axially interposed between said first clutch and said first centrifugal governor,
  2. said pawl portion of said first clutch being axially partly coextensive with said second clutch and extending to said first centrifugal governor;
m. a second centrifugal governor (32,30) connected to one clutch of said second pair for operating the same; and
n. drive means for rotating said governors in response to rotation of said driver.

3. A multiple-speed hub for a bicycle and like vehicle comprising, in combination:
a. a shaft (1) having an axis;
b. a driver (7) rotatably mounted on said shaft;
c. a hub shell (36) mounted on said shaft and on said driver for rotation about said axis;
d. a plurality of cooperating planetary-gearing elements including a sun gear (2) on said shaft, a ring gear (5) and a planet carrier (3) arranged for rotation about said axis, and a planet gear (4) rotatably mounted on said carrier in simultaneous meshing engagement with said sun gear and with said ring gear;
e. a driving sleeve member (9) and a driven sleeve member (31) rotatably mounted on said shaft and offset from said sun gear in opposite axial directions;
f. first coupling means (8) coupling said driving sleeve member to said driver for simultaneous movement about said axis;
g. second coupling means (34) coupling said driven sleeve member to said hub shell for simultaneous movement about said axis;
h. a first clutch (11,24) operatively interposed between said driving sleeve member and said planet carrier;
i. a second clutch (10,25) operatively interposed between said driving sleeve member and said ring gear;
j. a third clutch (28,26) operatively interposed between said driven sleeve member and said planet carrier;
k. a fourth clutch (29,27) operatively interposed between said driven sleeve member and said ring gear,
  1. said first and second clutches constituting a first pair of clutches, and
  2. said third and fourth clutches constituting a second pair of clutches;
l. a first centrifugal governor (20,16) connected to one clutch of said first pair for operating the same;
m. a second centrifugal governor (32,30) connected to one clutch of said second pair for operating the same;
n. drive means for rotating said governors in response to rotation of said driver; and
o. brake means in said shell operatively connected to one of said planetary-gearing elements for impeding movement of said one planetary-gearing element relative to another planetary-gearing element about said axis, at least one of said clutches being self-holding.

4. A hub as set forth in claim 1, wherein said planet carrier and said ring gear have respective portions axially coextensive with said driving sleeve member and spaced from said driving sleeve member in a radially outward direction, said first and second clutches being radially interposed between said driving sleeve member and said portions of said planet carrier and of said ring gear respectively, said portion of said ring gear partly enveloping said portion of the planet carrier and axially projecting beyond said portion of the planet carrier.

5. A hub as set forth in claim 4, wherein said first centrifugal governor is operatively connected to said first clutch, said second clutch being an overrunning clutch.

6. A hub as set forth in claim 5, wherein said first clutch is an overrunning clutch.

7. A hub as set forth in claim 1, one clutch of said first pair of clutches being a pawl-and-ratchet clutch.

8. A hub as set forth in claim 7, the pawl portion of said pawl-and-ratchet clutch being mounted on said driving sleeve member.

9. A hub as set forth in claim 8, wherein said first clutch is said pawl-and-ratchet clutch, said second clutch being axially interposed between said first clutch and said first centrifugal governor, said pawl portion being axially partly coextensive with said second clutch and extending to said first centrifugal governor.

10. A hub as set forth in claim 9, further comprising a control disc rotatable about said axis, one of said centrifugal governors including a plurality of flyweights mounted on one of said sleeve members for pivotal movement toward and away from said axis and for rotation about said axis with said one sleeve member; engaging means on each of said flyweights engaging said control disc, said engaging means rotating said control disc in response to pivoting movement of said flyweights and cooperating with said control disc for coupling the flyweights to each other in simultaneous pivoting movement, and operating means interposed between said control disc and the clutch connected to said one centrifugal governor for operating the connected clutch in response to said rotation of the control disc by said engaging means.

11. A hub as set forth in claim 1, wherein said sun gear, said ring gear, said planet gear and said planet carrier are substantially symmetrical relative to a plane radial relative to said axis.

12. A hub as set forth in claim 11, wherein said driving and driven sleeves are substantially identical.

13. A hub as set forth in claim 2, wherein said first centrifugal governor includes a flyweight mounted on said driving sleeve member for rotation therewith, said driving sleeve member constituting the drive means of said first centrifugal governor.

14. A hub as set forth in claim 13, said flyweight being axially offset from said first and second clutches in a direction away from said sun gear.

15. A hub as set forth in claim 2, said second centrifugal governor including a flyweight mounted on said driven sleeve member for rotation therewith, said driven sleeve member constituting the drive means of said second centrifugal governor.

16. A hub as set forth in claim 15, said flyweight being axially offset from said third and fourth clutches in a direction away from said sun gear.

17. A multiple-speed hub for a bicycle and like vehicle comprising, in combination:
  a. a shaft (1) having an axis;
  b. a driver (7) rotatably mounted on said shaft;
  c. a hub shell (36) mounted on said shaft and on said driver for rotation about said axis;
  d. planetary gearing in said shell and including a sun gear (2) on said shaft, a ring gear (5) and a planet carrier (3) arranged for rotation about said axis, and a planet gear (4) rotatably mounted on said carrier in simultaneous meshing engagement with said gear and with said ring gear;
  e. a driving sleeve member (9) and a driven sleeve member (31) rotatably mounted on said shaft and offset from said sun gear in opposite axial directions;
  f. first coupling means (8) coupling said driving sleeve member to said driver for simultaneous movement about said axis;
  g. second coupling means (34) coupling said driven sleeve member to said hub shell for simultaneous movement about said axis;
  h. a first clutch (11,24) operatively interposed between said driving sleeve member and said planet carrier;
  i. a second clutch (10,25) operatively interposed between said driving sleeve member and said ring gear;
  j. a third clutch (28,26) operatively interposed between said driven sleeve member and said planet carrier;
  k. a fourth clutch (29,27) operatively interposed between said driven sleeve member and said ring gear,
    1. said first and second clutches constituting a first pair of clutches, and
    2. said third and fourth clutches constituting a second pair of clutches,
    3. one clutch of said second pair of clutches being a pawl-and-ratchet clutch;
  l. a first centrifugal governor (20,16) connected to one clutch of said first pair for operating the same;
  m. a second centrifugal governor (32,30) connected to one clutch of said second pair for operating same,
    1. said second centrifugal governor including a plurality of flyweights mounted on said driven sleeve member for rotation therewith and being axially offset from the clutches of said second pair in a direction away from said sun gear;
  n. an axial projection on the pawl portion of said pawl-and-ratchet clutch extending toward said second centrifugal governor;
  o. a control disc rotatable about said axis;
  p. engaging means on each of said flyweights engaging said control disc,
    1. said engaging means rotating said control disc in response to pivoting movement of said flyweights and cooperating with said control disc for coupling the flyweights to each other in simultaneous pivoting movement,
  q. means on said control disc engaging said projection for moving said pawl portion relative to the ratchet portion of said pawl-and-ratchet clutch and for thereby operating said one clutch of said second pair; and
  r. drive means for rotating said first governor in response to rotation of said driver.

18. A hub as set forth in claim 18, wherein said planet carrier and said ring gear have respective portions axially coextensive with said driven sleeve member and spaced from said driven sleeve member in a radially outward direction, said third and fourth clutches being radially interposed between said driven sleeve member and said portions of said planet carrier and of said ring gear respectively, said portion of said ring gear partly enveloping said portion of said planet carrier and axially projecting beyond said portion of the planet carrier.

19. A hub as set forth in claim 18, wherein said second centrifugal governor is operatively connected to said fourth clutch, said third clutch being an overrunning clutch.

20. A hub as set forth in claim 19, wherein said fourth clutch is an overrunning clutch.

21. a hub as set forth in claim 17, the pawl portion of said pawl-and-ratchet clutch being mounted on said driven sleeve member.

* * * * *